3,348,322
MOLDBOARD WING
Richard P. Stewart, Omaha, Nebr., assignor to Omstell Industries, Inc., Omaha, Nebr.
Filed Oct. 6, 1964, Ser. No. 401,789
6 Claims. (Cl. 37—155)

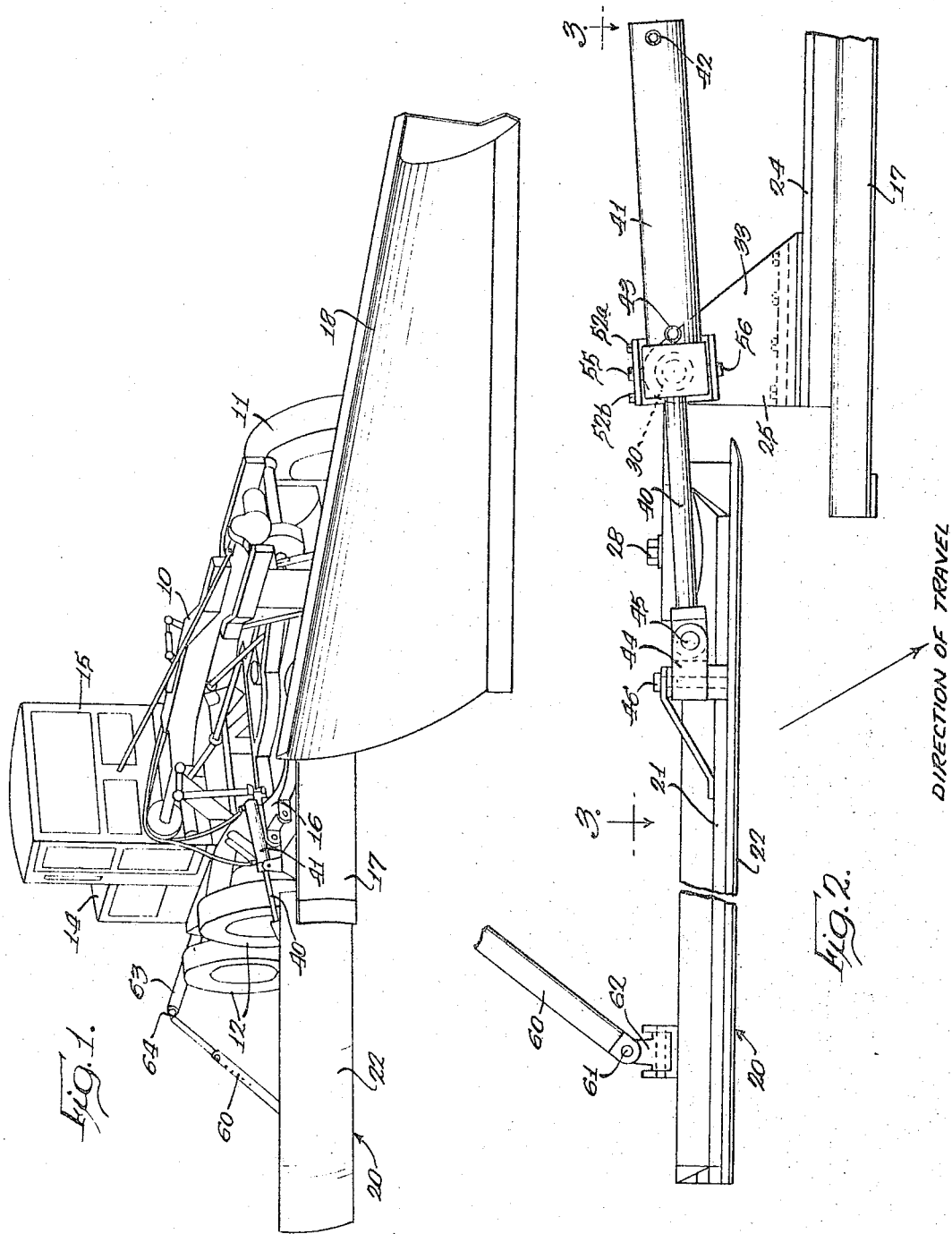

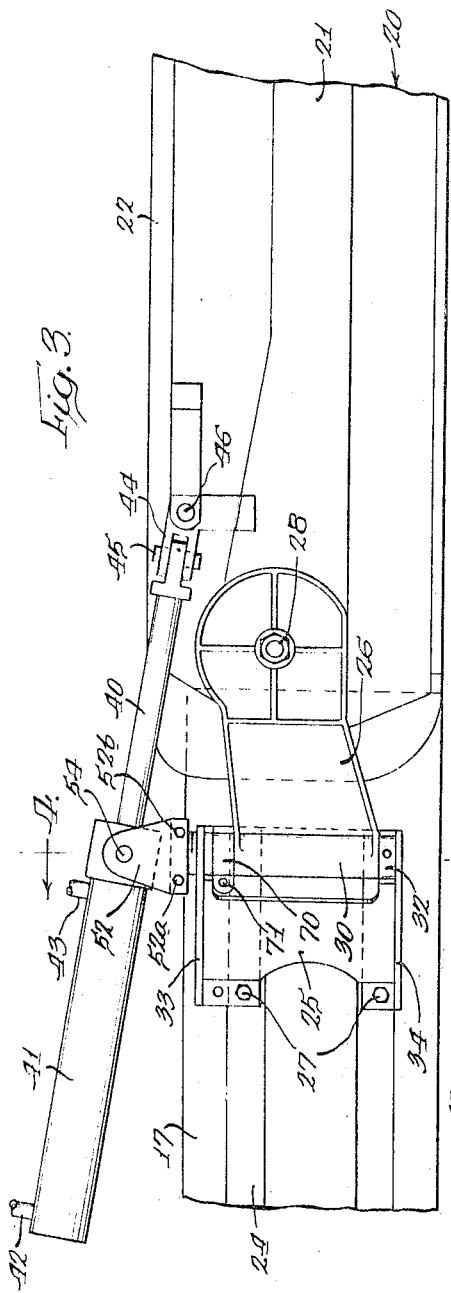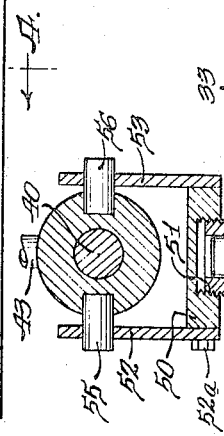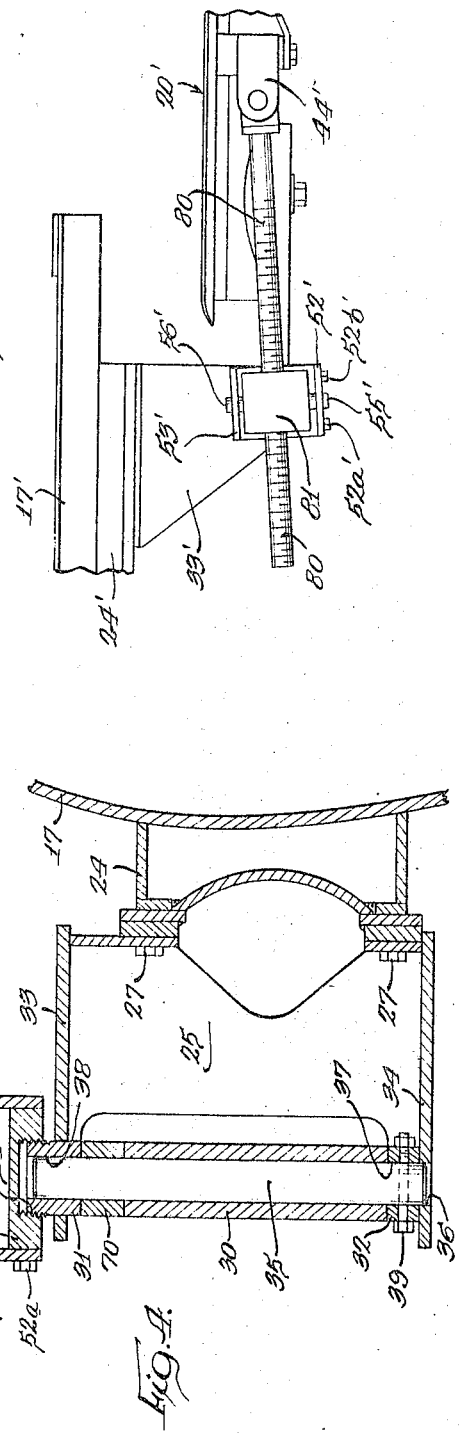

ABSTRACT OF THE DISCLOSURE

A wing for attachment to the moldboard of a motor grader including a mounting base having spaced collars, a member pivotally connected to the wing and pivotally connected to the collars by a sleeve aligned with the collars and a pivot pin extending through the sleeve and collars, a spacing collar positionable between one or the other of the collars and the sleeve to vary the height to the moldboard and an actuating means rotatably mounted on one of the collars of the mounting base for pivotal movement about the axis defined by the pivot pin and including an extendable rod connected to the wing.

Background of the invention

Various types of moldboard wings are available for association with a moldboard to form an extension to facilitate the plowing of snow or shoulder grading. These known mechanisms are deficient in one or more of the following respects: They are of a complicated construction, resulting in a costly device. They are not sufficiently flexible in use to permit good control of the wing in providing down-the-road clearance during operations, such as plowing. The wing is not positively held in operating position.

Summary of the invention

An object of this invention is to provide a moldboard wing attachable to the moldboard which has two-way, positive positioning, both with respect to an angle of extension relative to the moldboard as well as an angle of elevation with means for positively holding the wing in a predetermined position relative to the moldboard.

Another object of the invention is to provide a wing as defined in the preceding paragraph in which the wing, when attached to the moldboard, is located in overlapped relation with the moldboard to avoid any windrow or furrow and which can simply and quickly be attached or removed from the moldboard without substantial delay in the use of the motor grader.

Still another object of the invention is to provide a motor grader having a moldboard with an attachable wing pivotable about two axes relative to the moldboard to provide for both an angle of elevation and an angle of extension of the wing relative to the moldboard, with means under the immediate control of the operator connected to the wing to move the wing about the pivots and thus provide clearance for movement of the moldboard by lifting of the wing, as required when passing by mailboxes beside a roadway or bridge abutments, and with the wing moving means being pivotally mounted on one of the pivot axes to provide for movement of the automatic means simultaneously with the wing and thus reduce the linkages required to a minimum.

An additional object of the invention is to provide a combination as defined in the preceding paragraph in which the wing is mounted to the moldboard by means of an attachment base secured to the moldboard and a hinge member pivoted to the base and also to the wing, with the hinge member including a sleeve positioned in alignment with a pair of collars carried by the mounting base and with a pivot pin connecting the sleeve and collars, with the sleeve having a length less than the space between the collars, whereby a spacing member can be positioned either above or below the sleeve to determine the height of the wing relative to the moldboard to provide for difference in surface elevations or wear of cutting edges.

Still another object of the invention is to provide a moldboard wing attachment, as defined in the preceding paragraphs, in which the positioning of the wing relative to the moldboard can simply be obtained by a rigid member connected to the moldboard and to the wing with an adjustable nut mounted to the moldboard and threadably connected to the rigid member for positively holding the wing in position relative to the moldboard.

Further objects and advantages will become apparent from the following detailed description taken in connection with the accompanying drawings.

Description of the drawings

FIG. 1 is a perspective view of a motor grader showing the moldboard wing in association with the structure of the grader;

FIG. 2 is a plan view, on an enlarged scale, of the moldboard and moldboard wing, with the wing and a part of the strut structure broken away;

FIG. 3 is a rear elevational view, taken generally along the line 3—3 in FIG. 2;

FIG. 4 is a vertical section taken generally along the line 4—4 in FIG. 3; and

FIG. 5 is a fragmentary view of an alternate form of construction for positioning the wing relative to the moldboard.

Detailed description

While this invention is susceptible of embodiment in many different forms, there is shown in the drawings and will herein be described in detail an embodiment of the invention together with a modification thereof with the understanding that the present disclosure is to be considered as an exemplification of the principles of the invention and is not intended to limit the invention to the embodiments illustrated. The scope of the invention will be pointed out in the appended claims.

The motor grader is shown generally in FIG. 1 and includes a main frame 10 having a pair of front wheels, one of which is indicated at 11, and two rear wheels at each side of the frame, with the wheels 12 being indicated at one side. An engine is mounted at the rear end 14 of the grader with a cab 15 for an operator being provided at the location for steering and power control of the grader. As part of the standard equipment of the motor grader, a blade circle 16 carries a moldboard 17 having both linear and rotative movement relative to the motor grader to place the moldboard in a desired operating position. As shown for one type of plowing operation, a plow blade 18 is positioned at the front of the grader frame, extending at an angle across the front of the grader for directing material to a side of the frame.

A wing, indicated generally at 20, is associated with the moldboard to define a variable angle extension of the moldboard. This wing includes a frame 21, carrying a blade 22, with the wing mounted rearwardly of the moldboard 17 and having an end thereof adjacent to the moldboard overlapped with the moldboard to avoid a furrow or windrow during plowing.

The wing 20 is mounted to a moldboard. In one type, it is mounted, as shown, to a side shift rail 24, extending for substantially the entire length of the moldboard, by an attaching structure including a mounting bracket 25 and a hinge member 26. The mounting bracket 25 is secured to the rear of the side shift rail 24 adjacent an end thereof by a plurality of machine screws 27 threaded into the rail 24. In a moldboard not having a side shift rail, the attachment would be to the rear of the moldboard by means of a suitable attaching bracket.

The hinge member 26 is pivotally associated with the mounting bracket 25 by structure subsequently to be described. The hinge member pivotally supports the wing 20 for pivoting about a first axis defined by a pivot shaft 28 extending through the wing and holding the wing assembled to the hinge member. This axis of pivotal movement provides for a desired angle of elevation of the wing relative to the moldboard, so that the wing can form a substantially straight-line extension of the moldboard, or, alternatively, can be elevated or depressed. When fully elevated, the wing is in a position to avoid obstructions along the side of a road or at a lesser angle can provide an upward slope to material being graded. When depressed below the horizontal, the wing can be used in shoulder finishing.

The hinge member 26 includes a sleeve 30 positionable between an upper collar 31 and a lower collar 32 formed integrally with top and bottom flanges 33 and 34, respectively, of the mounting bracket 25. The sleeve 30 is held in assembled relation with the mounting bracket by means of a hinge pin 35 extending through the sleeve and collars. This pin can be inserted through an opening 36 in the lower flange 34 of the mounting bracket and through an opening 37 in the lower collar 32. The upper end of the pin fits within an opening 38 in the upper collar 31. The pin is held in assembled relation by means of a bolt and nut 39 passing through a suitable opening in the collar 32 and an opening in the lower end of the hinge pin 35. The hinge pin 35 thus defines a second pivot axis for the wing 20 which permits positioning of the wing at an angle of extension relative to the moldboard. With movement about this second pivot axis, the moldboard wing can either extend substantially parallel to the moldboard, or at a leading or trailing angle.

Means are provided for controlling the position of the wing relative to the moldboard and positively holding the wing in adjusted position. This means comprises a rigid rod 40 which, in the embodiment of FIGS. 1 to 4, is the rod of an hydraulic cylinder 41 having fluid lines 42 and 43 connected thereto. The piston rod 40 is connected to a clevis 44, by a pivot pin 45, with the clevis being pivoted to the rear of the wing by a pivot pin 46, whereby the wing can change angular relation relative to the cylinder 41 and the piston rod 40.

In order to provide a simple, actuating device with substantially straight-line action from the cylinder, the cylinder is mounted for pivotal movement with the wing about the second axis by mounting on the pivot axis defined by the hinge pin 35. This mounting includes a clevis having a base 50 rotatably threaded onto an upper externally threaded end of the collar 31, as indicated at 51, with clevis side plates 52 and 53 having aligned openings, one of which is shown at 54, in FIG. 3, for receiving trunnions 55 and 56 extending outwardly from the cylinder 41. The trunnion mounting permits up and down pivoting of the cylinder.

Additionally, a strut assembly, adjustable for length, extends between the rear of the wing 20 and a support bar 63 extending laterally from the rear of the grader for bracing the wing. This assembly includes a strut 60 pivotally connected at one end by means of a pivot pin 61 and a pivotally mounted clevis 62 to the rear of the wing 20 and at its opposite end to the lateral bar 63 by a pivot connection 64.

In operation, with the wing as shown in FIGS. 1 and 3, supplying of fluid to the cylinder 41 through the line 43 retracts the piston rod 40 to result in upward pivoting of the moldboard wing 20 about the first pivot axis defined by pivot shaft 28 to vary the angle of elevation. Because of the connection through the strut, this movement also results in some pivoting about the hinge pin 35 to vary the angle of extension. The cylinder 41 can adjust to these movements by the pivotal movement thereof in two planes. With the curvature placed upon the inner, lower corner of the wing 20, it is possible to pivot the wing to a substantially upright position by full retraction of the piston rod 40. Additionally, the piston rod 40 can extend a further distance from the cylinder 41 than that shown in the drawings to form a lowered angle of elevation with respect to the moldboard for shoulder grading with the position of the wing being accurately maintained through the continued application of fluid pressure to the cylinder 41, as controlled by an operator in the cab 15.

The effective over-all height of the wing, relative to the moldboard, can be varied from that shown in the drawings by a different location of a spacer 70, shown in FIGS. 3 and 4. This spacer is in the form of a generally U-shaped member having an internal opening of a size to receive the pivot pin 35. As shown, the spacer is located between the upper end of the sleeve 30 and the upper collar 31. The spacing collar is held to a fixed size by a bolt 71. In assembly of the ring to the moldboard, the wing may be placed in a higher effective operating position by placing the spacer 70 between the lower end of the sleeve 30 and the lower collar 32. Alternatively, a third effective height could be obtained by using two spacers, each half the height of the spacer shown and having one spacer above the sleeve and the other spacer below the sleeve.

The wing and operating mechanism therefor are provided as an attachment to the moldboard of the motor grader. This utilization of the structure as an attachment is facilitated by the simple manner in which the unit can be assembled or disassembled. In addition to removal of the strut 60, it is only necessary to remove the hinge pin 35, which disconnects the hinge member from the mounting bracket 25 and remove the cylinder 41. The retention of the mounting bracket 25 at the rear of the moldboard does not interfere with the operation the moldboard.

The cylinder 41 is easily removable by removal of the clevis side plate 52 by release of a pair of machine screws 52a and 52b which secure the side plate to the clevis base 50. Once this side plate is removed, the cylinder trunnions 55 and 56 can be removed and then the clevis can be entirely removed by rotation of the clevis base relative to the threaded upper end of the upper collar 31.

An alternate form of operation for the wing, particularly usable when the grader does not have an hydraulic control system, is shown in FIG. 5. In this form, similar parts have been given the same reference numeral as in the embodiment of FIGS. 1 to 4, but with a prime affixed thereto.

In this embodiment, the rigid member providing for positioning of the wing 20' relative to the moldboard 17' consists of a threaded rod 80, rather than the piston rod 40 of the first embodiment. This threaded rod is in threaded engagement with a nut 81 having trunnions 55' and 56' mounted in a clevis, similarly to the cylinder 41 of the first embodiment. The effective length of the rod 80 is determined by the position of the nut on the rod. When it is desired to adjust this position, the removable clevis side plate is removed, which then permits free rotation of the nut relative to the rod to determine a new effective length of the rod. The nut can then be restored in operative position in the clevis and the wing is maintained in a desired position. In order to facilitate the manual adjustment, the nut is first released from the clevis, and the moldboard can then be operated in a manner to cause the wing to assume the desired position, while the nut is adjusted and replaced in the clevis. No physical exertion is required in setting up the wing in a new relation.

With the structure disclosed herein, it will be apparent that a wing attachment for a moldboard has been provided which can simply be attached to the moldboard or detached therefrom.

Additionally, the wing can be moved to a desired position relative to the moldboard without affecting the operating position of the moldboard. This has importance in situations such as snowplowing, in which the plowing of the road must continue, even though a mailbox may be located beside the road. When this occurs, the cylinder 41 can be operated to raise the wing, while the moldboard continues plowing of the road. Also, the wing maintains its predetermined position by means of the rigid positioning member, so that the wing does not have freedom of movement to move upwardly relative to the moldboard if packed snow should be encountered. With the downpressure that can be exerted by the mechanism, it is possible to operate with the wing below grade with or without other material handling attachments.

I claim:

1. A wing attachment for a moldboard comprising, means for mounting the wing relative to the moldboard including a mounting base attachable to the rear of the moldboard and having spaced collars, a hinge member pivotally connected to the wing and pivotally associated with said collars by a sleeve aligned with said collars and a pivot pin extending through said sleeve and collars, one of said collars having a threaded extension, a clevis threaded on said extension for rotation about the same axis as said hinge member, positioning means for the wing mounted on said clevis including an extendable rigid member connected to the wing.

2. A wing attachment as defined in claim 1 in which said positioning means comprises an hydraulic cylinder and said rigid member is the rod of said cylinder.

3. A wing attachment as defined in claim 1 in which said positioning means is a nut and is threadably attached to said rigid member.

4. A wing attachment as defined in claim 3 in which said clevis includes a pair of aligned openings to receive trunnions extending from the nut with one of said openings being in a removable plate of the clevis whereby removal of the plate permits disengagement of the trunnions and rotation of the nut to adjust the effective length of said rigid member.

5. A wing attachment for a moldboard comprising, means for mounting the wing relative to the moldboard including a mounting base attachable to the rear of the moldboard and having spaced collars, a member connected to the wing and pivotally associated with said collars by a sleeve aligned with said collars and a pivot pin extending through said sleeve and collars, and a spacing collar positionable between one or the other of said collars and said sleeve whereby the location of the spacing collar determines the height of the member and wing relative to the moldboard.

6. A wing attachment for a moldboard comprising, means for mounting the wing relative to the moldboard including a mounting base attachable to the rear of the moldboard and having spaced collars, a hinge member pivotally connected to the wing and pivotally associated with said collars by a sleeve aligned with said collars and a pivot pin extending through said sleeve and collars, and a spacing collar positionable between one or the other of said collars and said sleeve whereby the location of the spacing collar determines the height of the hinge member and wing relative to the moldboard.

References Cited

UNITED STATES PATENTS

| 1,153,508 | 9/1915 | Magruder | 37—153 |
| 1,843,260 | 2/1932 | Arnold et al. | 37—155 |
| 1,993,282 | 3/1935 | Porter | 37—155 |
| 2,321,401 | 6/1943 | Lull | 37—155 |
| 2,646,633 | 7/1953 | Jahn | 37—155 |
| 2,847,772 | 8/1958 | McMullen | 37—155 |
| 2,948,973 | 8/1960 | Magouirk et al. | 37—143 |

FOREIGN PATENTS

| 162,635 | 3/1958 | Sweden. |

ABRAHAM G. STONE, *Primary Examiner.*

R. L. HOLLISTER, *Assistant Examiner.*

UNITED STATES PATENT OFFICE

CERTIFICATE OF CORRECTION

Patent No. 3,348,322                      October 24, 1967

Richard P. Stewart

It is hereby certified that error appears in the above numbered patent requiring correction and that the said Letters Patent should read as corrected below.

In the heading to the printed specification, lines 3 and 4, for "Omstell Industries, Inc." read -- Omsteel Industries, Inc. --.

Signed and sealed this 19th day of November 1968.

(SEAL)

Attest:

Edward M. Fletcher, Jr.                          EDWARD J. BRENNER

Attesting Officer                                Commissioner of Patents